United States Patent Office 3,681,056
Patented Aug. 1, 1972

3,681,056
PROCESS FOR WINNING METALS
Lloyd B. Lyon and Paul A. Little, Salt Lake City, Utah, assignors to American Refining Limited, Salt Lake City, Utah
Filed Apr. 21, 1969, Ser. No. 818,011
Int. Cl. C22b 15/12
U.S. Cl. 75—108   7 Claims

ABSTRACT OF THE DISCLOSURE

Metal values are brought into aqueous solution by milling and/or leaching techniques. The resulting metal-bearing solution is contacted with polysaccharide complexing agents to complex the metal values carried thereby. Metal-organic complexes are recovered and are treated by smelting and/or electrolytic techniques to recover substantially pure metals.

BACKGROUND OF THE INVENTION

Field.—This invention relates to the recovery of metal values from minerals and provides a novel recovery process, involving leaching and the recovery of metal values from leach solutions. Specifically, this invention provides a continuous process whereby all or most of the reagent materials may be recycled or recovered as valuable by-products.

State of the art.—Leaching of various mineral materials in dumps, heaps and vats is widely practiced for the recovery of copper, nickel and other metals, particularly the non-ferrous metals. Various acid-leaching techniques are practiced commercially in the copper industry, for example. It is also well known to leach various nickel and copper ores with ammoniacal solutions, notably ammoniacal solutions of ammonium carbonate.

U.S. Patent 3,374,081 to Miller suggests contacting brine solutions with various organic constituents leached from compost heaps to produce metal chelates. According to the patent, the chelates form a precipitate which may be recovered and treated for the recovery of the metal constituents.

The leaching techniques of the prior art have been commercially productive only when applied to certain ore materials. Other materials, such as copper oxide-silicate ores, although containing metal values in quantities which make them economically interesting, are not susceptible to conventional leaching. It is important for a large-scale leaching operation that the reagents introduced to the process be recoverable, either as by-products or for recycle. The non-conventional suggestions of the prior art concerning the leaching of difficult ores generally involve an unacceptable expenditure of reagent materials.

SUMMARY OF THE INVENTION

The present invention provides a method whereby many difficult ores, including metal oxide-silicate ores in general and copper oxide-silicate ores in particular, may be economically processed. Although the disclosure is directed principally to the treatment of such difficult ores, the invention has broad applicability and provides a unique cyclical process for recovering metal values from leach solutions generally. It is very effective for the recovery of metal values from sulfide ores, for example.

In its broadest aspects, non-ferrous ore is contacted with an aqueous extractant for the metal values sought to produce a metal-bearing aqueous solution. The metal-bearing solution is contacted with a polysaccharide complexing agent to form a metal-organic complex. The metal-organic complex is recovered and treated for the recovery of ammonia and metal values. The polysaccharide complexing agent may be produced in situ by the reaction of the basic leach solution with polysaccharide material, such as cellulose.

As specifically applied to metal oxide-silicate ores, such as serpentine $(Mg(Ni)_nSiO_4 \cdot 7H_2O)$ or various copper oxide-silicate ores, the ore may be leached with an ammoniacal solution of ammonium carbonate. This leaching step is believed to produce a metal-ammonia complex, probably typified by polyamines such as $Cu(NH_3)_6^{++}$ and $Ni(NH_3)_6^{++}$. The metal-ammonia complex is extracted from solution by bringing the solution into intimate contact with a polysaccharide complexing agent. Although the chemical mechanisms involved are not completely understood, it is believed that the complexing agent chelates, or otherwise complexes with, the polyamine. In any event, a metal-organic complex is formed which may be treated in various ways to recover both the metal values and the reagents consumed by the extraction step of the process.

The metal-organic complex may be roasted to volatilize $NH_3$ and $CO_2$, leaving a metal-organic residue. The volatilized constituents may be recovered, usually for recycle, and the metal-organic residue may be smelted for the recovery of metal values. The organic moiety of the metal-organic residue supplies all or part of the reducing agent required for the smelting procedure.

An alternative metal recovery procedure is to subject the metal-organic complex formed by the complexing procedure to electrolysis. Substantially pure metal may in this fashion be directly recovered, leaving an ammoniated organic residue. This residue may itself have commercial value as a nutrient or raw material, but it may also be roasted to volatilize $NH_3$. The $NH_3$ and the roasted polysaccharide residue may be recycled to the extraction portion of the process.

The extraction portion of the process involves intimately mixing the ore in particulate; e.g., comminuted, form with solvent for the metal values sought. Although ammoniacal aqueous solutions of ammonium carbonate are preferred for ores which contain substantial amounts of silicate or limestone, other known solvent systems, including mineral acid solutions, may be used with ores which are readily extracted by such solvents. The polysaccharide complexing agent may also be intimately mixed with the comminuted ore so that as the metal values are extracted from the ore they are brought into contact with the complexing agent. The proportions of reagents, ore, and complexing agent in the mixture, while important, are not critical to the operability of the invention.

It is usually desired to load the polysaccharide complexing agent with as high a metal content as is practicable. Thus, if in a particular instance, the complexing agent will complex about 10 percent of its own weight of the metal of interest during the time that it is in admixture with the ore, it is desirably introduced to the process in an amount about 10 times the weight of metal value in the ore. Of course, substantial deviation from this proportion is permissible. Total metal recovery will sometimes be significantly improved by including greater proportions of complexing agent in the extraction mixture.

By "polysaccharide complexing agent," or "complexing agent" is meant any organic material which contains, as a principal constituent, starches, glycogens, inulins, celluloses, chitins, gums, mucilages, or and derivative of such materails which retains the polysaccharide structure, modified, by hydrolysis or otherwise, to contain functional oxygen, nitrogen and/or hydroxyl groups so that it is capable of complexing metal ions, including complex ions such as the aforementioned polyamines. "Metal-organic complex" refers to the complex formed by the interaction of such a complexing agent with ore and/or leach solutions in accordance with the invention. "Metal-organic residue" refers to the residue remaining after a metal-organic complex is roasted to drive off volatile constituents, such as $NH_3$ and $CO_2$. "Barren complex" refers to the organic residue remaining after a metal-organic complex is submitted to electrolysis or other process to remove all or most of the metal values therefrom.

An ideal polysaccharide complexing agent for use according to this invention may be prepared in accordance with the teachings of copending application Ser. No. 795,660, filed Jan. 31, 1969, the disclosure of which is hereby incorporated by reference. It has been found, however, that a suitable complexing agent may be formed in situ if appropriate solvent systems are used. For example, when cellulose, in the form of wood shavings, sawdust, or bark, is mixed with ore in the presence of an ammoniacal aqueous sovent, it is quickly modified, probably by hydrolysis, sufficiently to complex metal values extracted by the solvent.

The composition and proportion of solvent used for the extraction portion of the process depends upon well known practical considerations and will vary depending on the ore being processed. It is preferred that the concentration of metal in the leach solution containing the complexing agent be high to enhance the kinetics of the complexing reaction. Thus, the liquid-to-solids ratio in the mixing equipment (a conventional pug mill may be used) will usually be kept as low as conveniently practical, having due regard for the energy requirements of the equipment. In the specific instance of extracting low-grade (less than 1 percent by weight) copper oxide-silicate ore with an ammoniacal aqueous solution of ammonium carbonate, liquid-to-solids weight ratios of between about 1:4 and about 2:1 are typical. The ammoniacal solvent typically contains about 8 to about 12 percent by weight ammonium carbonate and contains sufficient excess ammonia (more than two moles $NH_3^+$ per mole $CO_3^=$) to adjust its pH to between about 8 and about 10. Such solvents are effective extractants of metals such as copper, nickel, mercury, silver, gold, platinum and palladium from silicate, oxide and/or sulfide minerals. Moreover, such metals are selectively extracted by these solvents from minerals containing substantial quantities of iron, magnesium and other less desirable metals.

DESCRIPTION OF THE DRAWINGS

In the drawings, which illustrate what is presently regarded as the best mode for carrying out the invention.

DESCRIPTION OF THE ILLUSTRATED EMBODIMENTS

Figure 1:
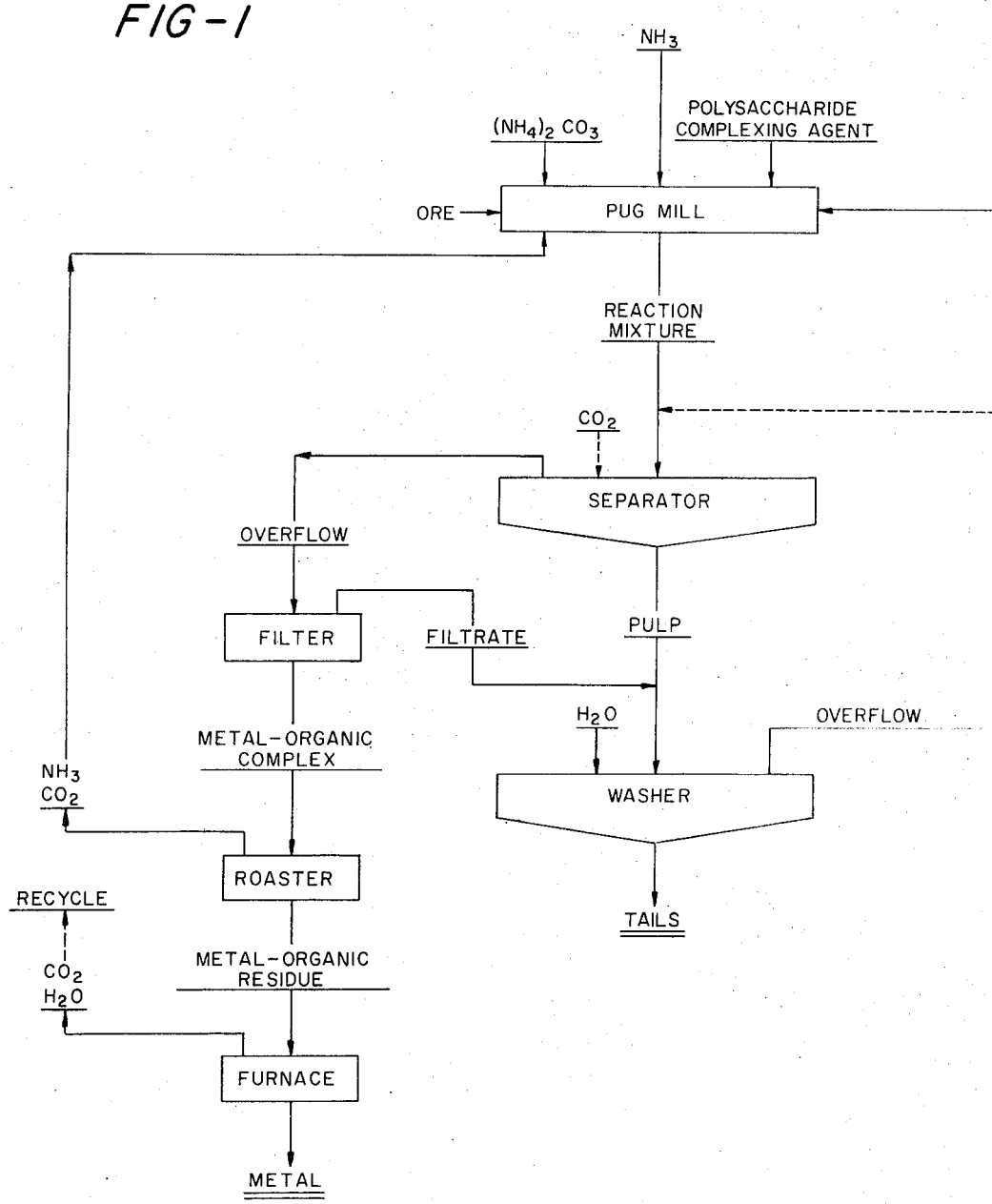
FIG. 1 is a flowsheet illustrating one embodiment of the invention.

According to the embodiment of FIG. 1, ore (preferably in finely divided or comminuted form) is introduced to a pug mill, together with about 5 to about 25 percent by weight, based on the weight of the ore, of ground bark, sawdust, or other inexpensive, available polysaccharide material. The polysaccharide material is preferably pretreated in accordance with the teachings of the aforesaid Ser. No. 795,660 to enhance its ability to complex metal ions. Sufficient solvent (an ammoniacal aqueous solution of ammonium carbonate, having a pH between 8.5 and about 9.5 and containing about 10 percent by weight ammonium carbonate) is introduced to maintain a liquid-to-solid weight ratio in the mill of about 1:1. The mixture is pugged at suitable temperature and pressure and for sufficient duration to extract the metal values from the ore and is then discharged to separation equipment, such as the conventional thickeners shown. Temperatures of about 60 to about 120° F., at ambient or autogenous pressure, are typical for the process. Milling times required vary, depending upon the nature of the ore being treated, but generally don't exceed about one hour.

The pH of the reaction mixture may be adjusted, if desired, in the separator to the range of about 7 to about 8.5 by the introduction of recycled $CO_2$ or stack gas. Such a pH adjustment may be desired to control the carbonate content of the reaction mixture.

The overflow from the separator contains substantially all of the metal-organic complex formed during the milling (or extraction) portion of the process. The overflow is thus filtered to recover this complex, and the filtrate is introduced, together with the pulp underflow from the separator, to washing equipment. (The washing equipment may be a second thickener as shown). Water is introduced to the washer as needed. The tailings from the washer contain substantially all of the gangue material introduced with the ore while the washings may contain significant quantities of metal values. The washings are thus recycled to the pug mill. A portion of the washings may be recycled to the separator to maintain proper pulp density therein.

The metal complex recovered from the filter is roasted, typically at temperatures between about 150 and about 500° F. Anhydrous ammonia and carbon dioxide volatilized by the roasting procedure are recycled to the pug mill to supply all or a portion of the ammonium carbonate requirement. The metal-organic residue from the roaster is smelted in a suitable furnace for metal recovery. Stack gas from the smelter furnace may be recycled to the pug mill to provide a portion of the carbonate requirement, or to the separator for pH control.

Figure 2:
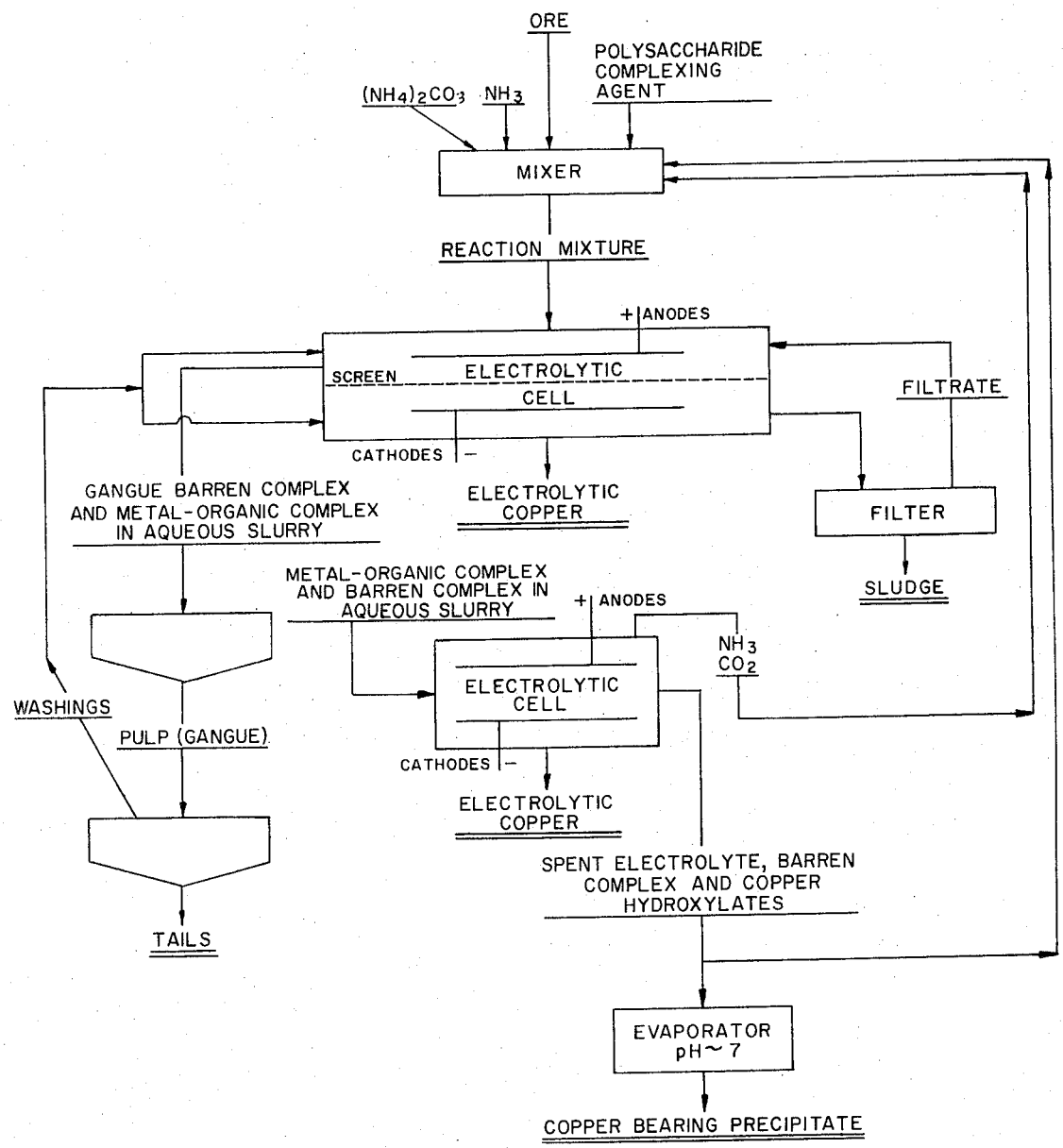
FIG. 2 is a flowsheet illustrating an alternative embodiment of the invention.

The embodiment illustrated by FIG. 2 includes a milling procedure similar to that of FIG. 1. The milled reaction mixture is introduced to a electrolytic cell. The cell illustrated has its positive electrodes separated from its negative electrodes by a screen or other barrier which permits flow of electrolyte while confining the gangue, metal-organic complex, and other solid material in the section of the cell containing the positive electrodes. Electrolytic copper (or other metal such as nickel) is recovered on the cathode. Spent electrolyte is filtered to remove sludge and is recycled to the cell.

The solid material moves through the positive side of the cell and is treated in a separator and a washer as described in connection with FIG. 1, except that the overflow from the separator is introduced to conventional electrowinning cells for the recovery of copper, and the washings overflow is recycled to the initial electrolytic cell (or cells) as shown. Ammonia and carbon dioxide generated in the electrowinning cells are recycled to the extraction procedure, together with spent electrolyte, barren complex, and copper hydroxylates from the secondary electrolytic cells.

The rigorous conditions of the process effect substantial degradation of the polysaccharide complexing agent. Copper hydroxylates, which do not give up their copper values under electrolysis, may thus be formed in objectionable quantities. A portion of the spent electrolyte mixture from the secondary electrolytic cells may be subjected to evaporation at about neutral pH to form a copper-bearing precipitate. This precipitate may be sold as a valuable raw material, or it may be separately treated; e.g., by smelting, for the recovery of copper.

Reference herein to details of the illustrated embodiments is not intended to limit the scope of the claims which themselves recite those features regarded as essential to the invention.

We claim:

1. A method for recovering metal values from metal-bearing mineral material, which comprises:

intimately mixing said mineral material in particulate form with an aqueous extractant therefore and a polysaccharide complexing agent in proportions to produce an aqueous slurry of gangue and metal-organic complex;

recovering said metal-organic complex from said slurry; and recovering metal values from said metal-organic complex.

2. A method according to claim 1, wherein the metal-organic complex is roasted to remove volatile constituents, thereby producing a metal-organic residue; and the metal-organic residue is smelted to recover metal values therefrom.

3. A method according to claim 2, wherein the volatile constituents removed by said roasting are recovered.

4. A method according to claim 1, wherein said aqueous slurry is subjected to electrolysis in a cell with anodes and cathodes operating at potentials and current densities such that metal is plated at the cathodes and volatile constituents of said complex are evolved at the electrodes; barren complex and gangue are withdrawn from said cell in aqueous slurry; and the electrolytic metal plating the cathode is recovered from said cell.

5. A method according to claim 1, wherein the metal-bearing material is copper oxide-silicate ore material; and metallic copper is recovered from said metal-organic complex.

6. A method according to claim 5, wherein the metal-organic complex is roasted to remove volatile constituents, thereby producing a copper-organic residue; and said copper-organic residue is smelted to recover copper values therefrom.

7. A method according to claim 5, wherein said aqueous slurry is introduced to the positive side of an electrolytic cell in which the positive electrodes are separated from the negative electrodes by a barrier which passes the aqueous phase but retains substantially all of the solid phase; said slurry is subjected to electrolysis in said cell to cause copper metal to plate out at the negative electrodes; spent electrolyte is withdrawn from the negative side of said cell; and barren complex is withdrawn from the positive side of said cell.

References Cited

UNITED STATES PATENTS

| | | | |
|---|---|---|---|
| 677,089 | 6/1901 | Kessler | 75—103 X |
| 755,302 | 3/1904 | Le Sueur | 75—117 |
| 790,429 | 3/1905 | Gutensohn | 75—108 |
| 904,684 | 11/1908 | Crumiere | 204—106 X |
| 1,115,351 | 10/1914 | Wagner | 204—107 |
| 1,358,096 | 11/1920 | Nagel | 75—108 |
| 1,423,070 | 7/1922 | Bardt | 75—108 |

OTHER REFERENCES

Merck Index, seventh edition, Merck & Co., N.J., 1960, p. 222.

GEORGE T. OZAKI, Primary Examiner

U.S. Cl. X.R.

75—103, 117, 119; 204—87, 106, 107, 108